United States Patent Office 3,632,618
Patented Jan. 4, 1972

3,632,618
SCHIFF'S BASES DERIVED FROM CYCLANIC AMINES, AND METHOD FOR USING SAME AS AGRICULTURAL PESTICIDES
Henri Pacheco, Bron, and Lucien Cronenberger, Daniel Pillon, and Jean Thiolliere, Lyon, France, assignors to PEPRO-Société pour le Developpement et le Vente de Specialites Chimiques
No Drawing. Filed May 21, 1968, Ser. No. 730,910
Claims priority, application France, May 26, 1967, 48,714
Int. Cl. C07c *119/00*
U.S. Cl. 260—429.9       19 Claims

ABSTRACT OF THE DISCLOSURE

New Schiff's bases having the general formula

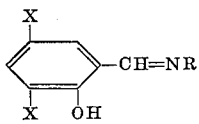

wherein X is halogen, and R is a cycloaliphatic or tetrahydronaphthyl radical, which may be substituted by one or more radicals such as OH, halogen, alkyl, halogenated alkyl; and the salts and metal chelates thereof; and their use as fungicides for agricultural use.

---

The present invention relates to new Schiff's bases derived from halosalicylic aldehydes, and to the use of such products as agricultural pesticides, in particular as fungicides.

The new products according to the invention have the general formula

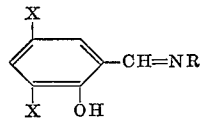

wherein X is halogen, and R is a cycloaliphatic or tetrahydronaphthyl radical, which may be substituted by one or more radicals such as OH, halogen, alkyl, halogenated alkyl.

The present invention relates also to the chelates of the compounds having the Formula 1, with divalent metals such as copper, zinc, iron, manganese, cobalt, and the like. Lastly, it relates to the organic salts of the esters of the compounds having the Formula 1, in particular to the acetates thereof.

The Schiff's bases are produced by condensing a dihalogenated salicylic aldehyde on a primary amine having the formula $H_2NR$, according to one of the following methods:

(A) Condensation is carried out at ordinary temperature, by mixing equimolecular amounts of aldehyde and amine, which have been previously dissolved in a suitable solvent such as methanol. The solution turns yellow immediately, and then, after a period of time ranging from a few seconds to several hours, the derivative crystallizes. The precipitate is drained, and then re-crystallized in a solvent such as ethanol, or methylketone.

(B) The above equimolecular mixture of aldehyde and amine is heated in toluene, with azeotropic removal of the water formed during the reaction. When the derivative cannot be crystallized by cooling, the solvent is allowed to evaporate under diminished pressure, and the residue re-crystallizes in water or in an organic solvent such as methanol.

The following compounds were prepared according to either of the above-mentioned methods:

| No. | X  | R                         | Yield, percent | Melting point, °C. |
|-----|----|---------------------------|---------------|--------------------|
| 1   | I  | Cyclopentyl               | 82            | 60                 |
| 2   | Br | Cyclohexyl                | 85            | 100                |
| 3   | Cl | Cyclopentyl               | 91            | 80                 |
| 4   | Br | Tetrahydro 1-2-3-4 naphthyl-1 | 90        | 126                |
| 5   | Br | o-Hydroxycyclohexyl       | 48.5          | 169                |
| 6   | I  | Cyclohexyl                | 77            | 115                |
| 7   | Cl | ....do....                | 66            | 66                 |
| 8   | I  | o-Hydroxycyclohexyl       | 74            | 194                |
| 9   | I  | Tetrahydro 1-2-3-4 napthyl-1 | 92         | 125                |
| 10  | Cl | ....do....                | 51            | 111                |
| 11  | Cl | o-Hydroxycyclohexyl       | 71            | 184                |
| 12  | Cl | o-Chlorocyclohexyl        | 88            | 103                |
| 13  | I  | Tetrahydro 1-2-3-4 naphthyl-2 | 86        | 138                |
| 14  | Cl | ....do....                | 97            | 144                |

The organic salts of the esters of Schiff's bases are produced by allowing the anhydride of the organic acid to react with the corresponding Schiff's base.

By way of example, one part of Schiff's base is poured into 10 parts of acetic anhydride containing 1% pyridine. The mixture is allowed to stand for 24 hours, at ordinary temperature. The excess acetic anhydride is then removed at reduced pressure, and the acetate of the O-acetylated derivative precipitates, and is re-crystallized in ethanol.

The following products were obtained by said method:

$$\text{Cl} \quad \underset{\text{Cl OCOCH}_3}{\text{—CH=N—}} \langle \text{H} \rangle, \quad CH_3COOH \quad \text{M.P. } 141°C. \quad \text{Yield}=55\%$$

$$\text{Cl} \quad \underset{\text{Cl OCOCH}_3}{\text{—CH=N—}} \langle \text{H} | , \quad CH_3COOH \quad \text{M.P. } 102°C. \quad \text{Yield}=43\%$$

PREPARING THE CHELATES

The chelates are produced by allowing a soluble metal salt to react with the Schiff's base.

By was of example, a concentrated aqueous solution containing 0.1 mole of metal acetate, is poured at ordinary temperature into an alcoholic solution containing 0.2 mole of Schiff's base. The chelate precipitates immediately. After being drained, and then washed with water and ethanol, it re-crystallizes as a rule in ethanol, methylethylketone, dimethylformamide, or a mixture of said solvents. With this method, chelates are produced, which have the general formula:

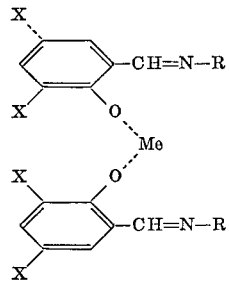

wherein X and R have the same meanings as hereinabove, and Me is a divalent metal.

The following compounds may be mentioned in particular:

| X | R | Me | Yield, percent | Melting point, °C. |
|---|---|---|---|---|
| Br | Cyclopentyl | Cu | 96 | 218 |
| Cl | Cyclohexyl | Cu | | 244 |
| Cl | do | Co | | 246 |
| Cl | do | Zn | | 238 |

The fungicidal action of the above compounds was determined by tests on a number of plant parasitic fungi.

Obviously, the fungi in the tests described hereinafter are only mentioned by way of example, to illustrate the fungicidal activity of the compounds according to the invention, and do not represent the whole range of activity of said compounds.

(I) TESTS ON LIVING PLANTS

The tests are carried out as preventive treatments. The individual plant is first treated with a mixture prepared from a wettable powder diluted so as to have a concentration of 2 g./l. of active material. The plant is then infected with spores of the fungus selected. After from 5 to 15 days, depending on the fungus selected, the fungicidal activity is observed, and given a mark from 0 (no action) to 4 (total action).

In every test, the products according to the invention were compared with dichloro-salicylidene aniline having the formula

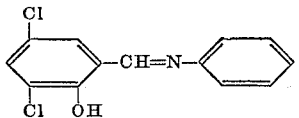

the fungicidal action of which was studied by Smith and Read, (Annals of Applied Biology 1961, 49, 242–245).

(a) Test relating to corn-mildew

In this test, the compounds Nos. 1, 3, 6, 7, and 8 obtained a mark 4 for protection against *Erisyphe graminis,* which is the cause of corn-mildew. Under the same conditions, the salicylidene aniline of Smith and Read only obtains a mark 2.

(b) Test relating to "*Alternaria solani*" (tomatoes)

In this test, the compounds Nos. 3 and 11 obtained a mark 4, whereas the product studied by Smith and Read obtained only a mark 3.

(c) Test relating to celery septoriasis

In this test, the compounds 1, 2, 3, 5, 6, 7, 8, 9 and 11 provided a total protection (mark 4) against *Septoria apii,* whereas the product studied by Smith and Read only obtained a mark 3.

(II) Tests on vine leaves

The treatment is effected by means of the same wettable powder (diluted so as its concentration is 0.01 g./l. of active material) on a vine-leaf still alive, which is then infected with *Plasmopara viticola.* In this test, the compounds Nos. 1, 3, 5, 7 and 9 prevented totally the growth of said parasitic fungus.

With a dose ten times smaller, the protection provided by compound No. 1 was still total. In this test, a dose ten times higher of the product of Smith and Read is required to obtain the same extent of protection.

With a view to using practically the compounds according to the invention, said compounds should be formulated according to the technics conventionally used in the pesticide industry. Thus, they may be used as powders to be sprinkled, wettable powders, solutions, direct or reversed emulsions of water in oil, or oil in water, and the like.

These various types of formulations require normally the addition of inert carriers, such as clays, talc, or the like, solvents such as water or organic solvents, as well as various adjuvants adapted to further the use and physical properties of the compositions produced. Such adjuvants many be emulsifying agents, and/or anticaking agents, and/or wetting agents, and/or sticking agents, and the like.

What we claim is:

1. A Schiff's base having the formula:

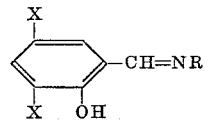

wherein X is halogen and R is cyclopentyl, cyclohexyl or tetrahydronaphthyl, the said cyclohexyl may be substituted in ortho position by OH or Cl; or the acetate salt of the o-acetylated derivative or the metal chelate thereof wherein the metal is selected from the group consisting of copper, zinc, iron, manganese and cobalt.

2. Compounds according to claim 1 which have the general formula

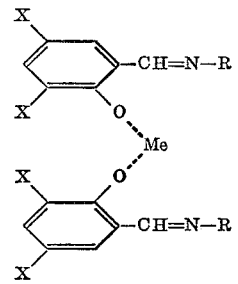

wherein X and R are according to claim 1 and Me is said metal.

3. A compound in accordance with claim 1 wherein X is iodine and R is cyclopentyl.

4. A compound in accordance with claim 1 wherein X is bromine and R is cyclohexyl.

5. A compound in accordance with claim 1 wherein X is Cl and R is cyclopentyl.

6. A compound in accordance with claim 1 wherein X is Br and R is tetrahydro-1-2-3-4 naphthyl-1.

7. A compound in accordance with claim 1 wherein X is Br and R is o-hydroxycyclohexyl.

8. A compound in accordance with claim 1 wherein X is I and R is cyclohexyl.

9. A compound in accordance with claim 1 wherein X is Cl and R is cyclohexyl.

10. A compound in accordance with claim 1 wherein X is I and R is o-hydroxycyclohexyl.

11. A compound in accordance with claim 1 wherein X is I and R is tetrahydro 1-2-3-4 naphthyl-1.

12. A compound in accordance with claim 1 wherein X is Cl and R is tetrahydro 1-2-3-4 naphthyl-1.

13. A compound in accordance with claim 1 wherein X is Cl and R is o-hydroxycyclohexyl.

14. A compound in accordance with claim 1 wherein X is I and R is tetrahydro 1-2-3-4 naphthyl-2.

15. A compound in accordance with claim 1 wherein X is Cl and R is tetrahydro 1-2-3-4 naphthyl-2.

16. A compound in accordance with claim 2 wherein X is Br; R is cyclopentyl and Me is Cu.

17. A compound in accordance with claim 2 wherein X is Cl; R is cyclohexyl and Me is Cu.

18. A compound in accordance with claim 2 wherein X is Cl; R is cyclohexyl and Me is Co.

19. A compound in accordance with claim 2 wherein X is Cl; R is cyclohexyl and Me is Zn.

References Cited

UNITED STATES PATENTS

| | | | |
|---|---|---|---|
| 3,090,720 | 5/1963 | Kenaga | 167—31 |
| 3,153,093 | 10/1964 | Horrom et al. | 260—570.5 |
| 3,253,022 | 5/1966 | Linder et al. | 260—518 |
| 3,357,883 | 12/1967 | Pillon et al. | 167—31 |

LEON ZITVER, Primary Examiner

G. A. SCHWARTZ, Assistant Examiner

U.S. Cl. X.R.

260—429 C, 438.1, 439 R, 479 R, 566 F; 424—287, 289, 294, 295, 311, 325